United States Patent
Germano et al.

(10) Patent No.: US 10,848,791 B1
(45) Date of Patent: Nov. 24, 2020

(54) DETERMINING PORTIONS OF VIDEO CONTENT BASED ON ARTIFICIAL INTELLIGENCE MODEL

(71) Applicant: Amazon Technologies, Inc., Seattle, WA (US)

(72) Inventors: Vernon Germano, Bainbridge Island, WA (US); Xiang Hao, Kenmore, WA (US); Kripa Kanchana Sivakumar, Seattle, WA (US); Benjamin Cheung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 16/174,844

(22) Filed: Oct. 30, 2018

(51) Int. Cl.
*H04N 21/234* (2011.01)
*H04N 21/25* (2011.01)
*H04N 21/258* (2011.01)
*H04N 21/472* (2011.01)
*H04N 21/845* (2011.01)
*G06K 9/00* (2006.01)
*G06K 9/62* (2006.01)

(52) U.S. Cl.
CPC ... *H04N 21/23418* (2013.01); *G06K 9/00718* (2013.01); *G06K 9/6256* (2013.01); *G06K 9/6262* (2013.01); *H04N 21/23424* (2013.01); *H04N 21/251* (2013.01); *H04N 21/25891* (2013.01); *H04N 21/47217* (2013.01); *H04N 21/8455* (2013.01)

(58) Field of Classification Search
CPC ....... H04N 21/23418; H04N 21/23424; H04N 21/251; H04N 21/25891; H04N 21/47217; H04N 21/8455; G06K 9/00718; G06K 9/6256; G06K 9/6262
See application file for complete search history.

(56) References Cited

U.S. PATENT DOCUMENTS

| 9,436,876 | B1* | 9/2016 | Carlson | G06K 9/469 |
| 2017/0178346 | A1* | 6/2017 | Ferro | G06K 9/00718 |
| 2017/0329769 | A1* | 11/2017 | Berg | G06K 9/00718 |
| 2019/0065897 | A1* | 2/2019 | Li | G06K 9/46 |
| 2019/0236371 | A1* | 8/2019 | Boonmee | G06K 9/00718 |
| 2020/0068253 | A1* | 2/2020 | Kim | G06K 9/00718 |

* cited by examiner

*Primary Examiner* — Randy A Flynn
(74) *Attorney, Agent, or Firm* — Kilpatrick Townsend & Stockton LLP

(57) ABSTRACT

Techniques for providing video content are described, where portions of the video content may be determined based an artificial intelligence model. In an example, a computer system may input, to a neural network, a vector representation of a frame. The neural network may be configured based on an error of associating the frame with an incorrect category. The error may be based on timing of the frame and on an error time margin relative to a start time or an end time of the incorrect category. The computer system may receive back an association between the vector representation and a category and may generate, based on the association, an identifier of a portion of the video content. The identifier may associate the portion of the video content with the category and identify a start time or an end time of the portion of the video content.

20 Claims, 7 Drawing Sheets

DETERMINING PORTIONS OF VIDEO CONTENT BASED ON ARTIFICIAL INTELLIGENCE MODEL

BACKGROUND

Multimedia services provide different functionalities to end users. For example, an end user may operate a computing device to access a multimedia service that supports video on demand. Video content may be streamed from a content server to the computing device. The multimedia service may allow the user to play, pause, fast forward, rewind, access video information, and control other video-related functionalities. In many cases, the video content may include portions that may be of interest and other portions that may be of lower interest to the end user.

BRIEF DESCRIPTION OF THE DRAWINGS

Various embodiments in accordance with the present disclosure will be described with reference to the drawings, in which.

DETAILED DESCRIPTION

Figure 1:
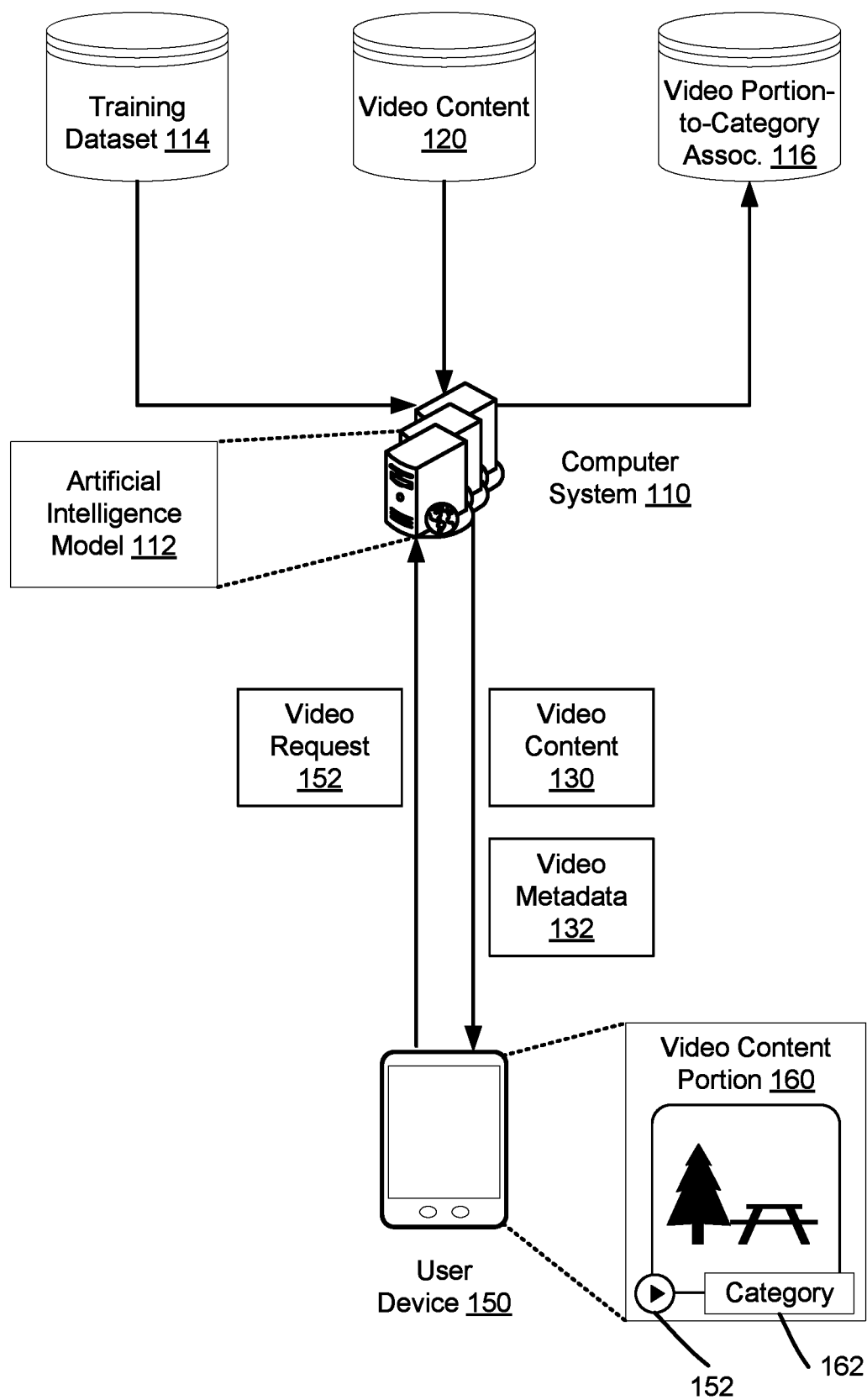
FIG. 1 illustrates an example computing environment for providing a multimedia service based on an artificial intelligence model, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a multimedia service that provides video content, where portions of the video content may be determined based at least in part on an artificial intelligence model. In an example, the artificial intelligence model may be trained to identify and classify the portions into different categories and optimize the start time and end time of each of these portions within the video content. Each of the categories may correspond to a potential user level of interest for viewing content. When a portion is presented at a computing device of an end user, the corresponding category may be presented along with a skip option. In this way, if the end user has a low interest in viewing the portion, the skip option may be used to move to a more interesting portion of the video content.

To illustrate, consider an example of streaming digital video (e.g., video on demand). In this example, a thirty-minute video file, such as an episode from a television series, may include a minute of video start credits (e.g., providing information about the movie studio, introducing the episode, etc.), followed by two minutes of video recap (e.g., summarizing content of the previous episode), twenty-four minutes of new content specific to the episode, and three minutes of video end credits (e.g. presenting a list of actors, identifying music tracks, etc.). The video start credits, video recap, and video end credits may be of lower interest to end users relative to the new content. Hence, an end user may desire to skip the presentations of these lower interest portions of the video file. To enable such skipping functionalities, an artificial intelligence model may be trained to identify portions of the video file and classify them into video start credits, video recap, video end credits, and video-other categories. The artificial intelligence model may also be trained to predict the timings of these portions within an error margin (e.g., within three seconds, such that the portions identified as video start credits can be recognized as ending by the end of the first minute plus or minus three seconds). The training may use a large dataset of video files of different lengths and genres to achieve a robust performance. Once trained, the video file may be input to the artificial intelligence model. In response, the output of the artificial intelligence model may identify that the first fifty-nine seconds correspond to video start credits, the next two minutes correspond to video recap, and the last three minutes correspond to video end credits. This information may be stored in the metadata of the video file. Upon sending the video file and metadata to a computing device of the end user, the computing device may start playing the video file. In doing so and based on the metadata, the computing device may identify the first fifty-nine seconds as introduction and present an option to skip to the next portion. If that option is selected, the computing device may start playing the next two minutes of video recap and may also present an option to skip this portion. If the option is selected, the computing device may start playing the new content. Upon reaching the end of the new content, the computing device may start playing the video end credits and also present a skip option.

The embodiments of the present disclosure may provide many technological benefits over existing systems. Generally, existing systems may rely on manual or automated processes to identify different portions within video content. Manual processes may be tedious and may not properly scale up to support a large library of video content. Existing automated processes may not be accurate. For example, an existing automated process may identify the portions based on average lengths of video start credits, video recap, and video end credits. In particular, if the average length of start credits is a minute and a half, this process may identify the first minute and a half of each video file as video start credits, regardless of where these credits may actually occur. In another example, an existing automated process may consider pixel property changes, such as color, brightness, etc. between scenes within a video file to then identify the different portions. However, such a process may perform poorly when, for instance, the changes between the video recap and the new content are insignificant (in which case, this process may identify the new content as belonging to the video recap), or when changes within one portion are significant (e.g., if the video recap includes a day scene and a night scene, the process may incorrectly identify that one of these scenes does not belong in the video recap).

In contrast, the embodiments of the present disclosure provide an automated process that can be properly scaled and that can provide accurate results. In particular, the training dataset may include a large and diverse set of video content and training labels identifying the different categories at a frame level. The artificial intelligence model may include different neural networks, one that may learn inherent features and generate vector representations at the frame level, and one that may be trained to categorize the portions into the categories and their timings based on the vector representations. In addition, a loss function may be defined based on an error margin relative to a start or an end of a categorized portion (e.g., plus or minus three seconds from the start or end) to further increase the performance robustness.

In the interest of clarity of explanation, the embodiments of the present disclosure are described in connection with a video file that includes video start credits, video end credits, video recap, and video-other portions. For such a type of video file, categories may be defined including video start credits, video end credits, video recap, and video-other categories. However, the embodiments are not limited as such. Instead, the embodiments may similarly apply to any content including different portions. The content may be video, audio, text, and/or other content types. Each portion of the content may be categorized in a category, where the different categories may correspond to potentially different varying levels of user interest or may correspond to different scenes or sections within the content.

FIG. 1 illustrates an example computing environment for providing a multimedia service based on an artificial intelligence model, according to an embodiment of the present disclosure. In an example, the multimedia service may support a video on demand service that enables an end user to download or stream video content. As illustrated, the computing environment may include a computer system 110 of a service provider and a user device 150. The computer system 110 may implement functionalities of the video on demand service by controlling access to a library 120 of video content. The end user may operate the user device 150 to access these functionalities over a data network (not shown in FIG. 1), such as the Internet, where the access may rely on a registration of an account of the end user with the service provider.

Upon a video request 152 from the user device 150, the computer system 110 may send the requested video content 130 from the library to the user device 150. In turn, the user device 150 may present the video content 130 on a graphical user interface (GUI) and provide different playback 152 options, such as play, fast forward, rewind, and the like. Further, while the user device 150 presents a portion 160 of the video content 130 (e.g., while presenting the video start credits), an identifier corresponding to the category 162 of the portion 160 may also be presented at the GUI. The identifier may identify the category 162 and may be presented as a selectable skip option. Upon a user selection of the skip option, the user device 150 may skip the presentation of the portion 160 and start presenting the next portion of the video content 130.

The skip option may be provided based on metadata 132 of the video content 130. In particular, the user device 150 may receive the metadata 132 from the computer system 110 along with the video content 130. The metadata 132 may include association information that identifies timestamps and/or frames in the video content 130 and their associations with the portions of the video content and the categories of these portions. For instance, the metadata 132 may identify that the first minute of the video content 130 is a portion corresponding to a video start credits category, the next two minutes is a portion corresponding to a video recap category, and the last three minutes is a portion corresponding to the video end credits category. The metadata 132 may also include sequence information that identifies a sequence of the portions and/or dependencies between the presentation of the portions. For instance, the metadata 132 may identify that the video start credits portion should be presented first and, if skipped, the video recap portion should be skipped too.

When presenting the video content 130, the user device 150 may identify the current video time and/or presented frame, match that to the association information from the metadata 130, and determine the corresponding category 162 from the metadata 130. Upon a selection of the skip option, the user device 150 may determine the next portion based on the sequence information from the metadata 130 and may move to the presentation of the next portion accordingly.

In an example, the computer system 110 may generate the metadata 132 based on an artificial intelligence model 112. This model 112 may be trained to identify and classify video portions into different categories and set the start time and end time of each of the video portions. The training may rely on a training dataset 114 accessible to the computer system 110 from a data store (e.g., a database). This training dataset 114 may include a large and diverse set of video content of different lengths and genres. In a supervised training mode, the training dataset 114 may also include training labels that identify the video portions and the corresponding categories. Such training labels can be used as the ground truth.

Upon completion of the training, the computer system 110 may input a video file (e.g., individual video content) from the library 120 to the artificial intelligence model 112. In response, the artificial intelligence model 112 may output identifiers of the video portions of this file and their associations with the categories. For instance, the artificial intelligence model 112 may identify that the first minute of the video file is a first portion corresponding to video start credits, the next two minutes are a second portion corresponding to a video recap, and the last three minutes are a third portion corresponding to a video end credits.

The computer system 110 may accordingly store this information as video portion-to-category association 116 in a data store (e.g., in a database). For instance and continuing with the preceding example, the computer system may store multiple key-value pairs. Each key may correspond to a timestamp or a frame of the video file. Each value may correspond to the corresponding category. To identify the three different portions, it may suffice to use six key-value pairs. The first pair may identify the start of the first portion and its association with the video start credits category, the second pair may identify the end of the first portion and its association with the video start credits category, and so on and so forth.

In addition, the computer system 110 may generate association information for the metadata of the video file from the key-value pairs. The sequence information may also be generated automatically based on a set of rules or logic that depends on the categories, that the service provider may define, that the computer system 110 may store and execute. The metadata of the video file may be stored in the library 120.

Although FIG. 1 describes a video on demand service, the embodiments of the present disclosure are not limited as such. For example, the embodiments may similarly apply to a live content stream service (e.g., live video and/or audio streams). In particular, the user device 150 may receive live stream content from the computer system 110 (e.g., for a sports event). This live stream content may be a first stream of content available from a channel (e.g., sports audio and video available from a sports channel). The computer system 110 may input in real-time the live stream content to the artificial model 112 to also generate the relevant portion-to-category associations in real-time (real-time may refer to processing the content within an acceptable processing latency relative to the time the content becomes available). Upon a detection of a change in the first live stream content from a first category to a second category (e.g., over time, frames were associated with the first category, but then a number of the most recent frames became associated with the second category), the computer system 110 may provide one or more options to update the first live stream content. One example option may include updating the first stream to a second stream of content (e.g., to switch from the sports channel to another channel). Another option may be to include second live stream content in the first stream (e.g., by staying on the sports channel, but switching the stream from a camera on the sports field to a camera on the crowd). Yet another option maybe to include pre-stored content in the first stream (e.g., by inserting targeted content in the first stream). The computer system 110 may continue to input in real-time the first live stream content to the artificial intelligence model 112. Upon a detection of an additional change (e.g., the most recent frames became associated with the first category again or with a third category), the computer system 110 may provide one or more additional options to switch back to the first live stream content. The different options may be provided to the user device 150 and presented therein for a user selection. Additionally or alternatively, some of these options may be automatically selected by the computer system 110 and/or the user device based on predefined logic (e.g., a set of rules that trigger the selection based on user preferences).

Figure 2:
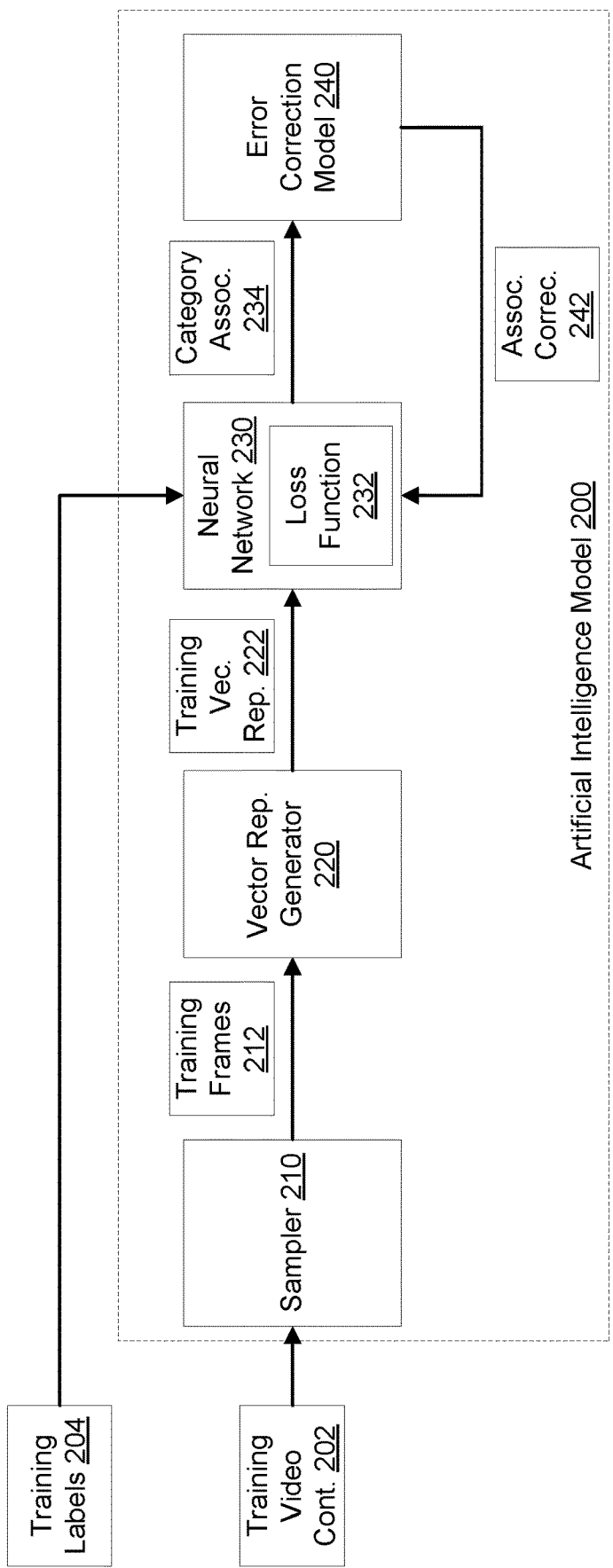
FIG. 2 illustrates an example computing environment for training an artificial intelligence model, according to an embodiment of the present disclosure.

FIG. 2 illustrates an example computing environment for training an artificial intelligence model 200, according to an embodiment of the present disclosure. The artificial intelligence model 200 may correspond to the artificial intelligence model 112 of FIG. 1. The training may rely on training video content 202 and training labels 204. The training video content 202 and training labels 204 may correspond to the training dataset 114 of FIG. 1.

In an example, the artificial intelligence model 200 may include a sampler 210 and multiple video processing models, such as a vector representation generator 220, a neural network 230, and an error correction model 240. During the training phase, the training video content 202 and the training labels 204 may be input to the artificial intelligence model 200 to update and fine tune parameters of the neural network 230.

In particular, the training video content 202 may include multiple video contents (e.g., video files). Each video content may include a set of frames at a particular frame rate (e.g., twenty-four frames per second) and may be input to the sampler 210. In turn, the sampler 210 may select frames based on a sampling of the video content, where the sampling may be performed at a different frame rate (e.g., a lower frame rate of two frames per second). The selected frames may be outputted as training frames 212.

The training labels of one training video content may correspond to portions of this content. In particular, if the training video content starts with first minute of video start credits followed by two minutes of video recap, and ends with three minutes of video end credits, the training labels may identify that the first minute corresponds to a video start category, the next two minutes to a video recap category, and the last three minutes to a video end credits category.

Because training frames, rather than the training video content is used, the training labels may be further associated with the training frames. For example, upon the sampling by the sampler 210, if a training frame is selected from the first minute, a training label for that training frame may be generated and may indicate that the training frame belongs to the video start category. A similar approach may be used to label the training frames falling within the video recap portion and video end credits portions as belonging to the video recap category and video end credits category, respectively.

The training frames 212 may be input to the vector representation generator 220. In an example, this generator 220 may include a neural network already trained to detect objects in frames based on pixel properties, such as color, brightness, texture, and/or other properties. The vector representation generator 220 may output a training vector representation for each of the training frames 212. The training vector representation may include features that are learned by the vector representation generator 220 based on pixel properties of the corresponding training frame. For instance, the training vector representation may be a vector of 4,096 features. The resulting training vector representations 222 may be organized as a time-series sequence (e.g., based on the original timing or sequence of the training frames in the corresponding training video content). This time-series sequence and the training labels 204 may be input to the neural network 230 that is under training.

The neural network 230 may be trained to associate a vector representation of a frame and a category. Each training label may be associated with a training frame and may identify the category to which the training frame belongs. Upon an analysis of a vector representation of the training frame, the neural network 230 may use the training label as ground truth.

In an example, the neural network 230 may be a recurrent neural network trained with a loss function 232. The loss function 232 may be defined based on an error of associating a training frame with an incorrect category, where the error is based on timing of the training video frame and on an error time margin (e.g., three seconds) relative to a start time or an end time of the incorrect category. For instance, the loss function 232 may include an evaluation metric that may be adjusted based on the error. To illustrate, the training labels may indicate that the video recap portion starts at minute one and ends at minute three. The error time margin may be defined as three seconds around these start and end times, resulting in a margin start time of fifty-seven seconds, a margin end time of three minutes and three seconds, and an overall time range of fifty-seven seconds to three minutes and three seconds. If a training frame labeled as belonging to the video start credits portion is actually predicted as belonging to the video recap category, the evaluation metric may be adjusted to impose a penalty on this prediction. The amount of the penalty may depend on the timing of the training frame. If the timing is less than fifty-seven (e.g., the training frame is outside the overall time range), the penalty is increased. If the timing is between fifty-seven seconds and one minute, the penalty may be decreased.

The loss function 232 may also include an evaluation metric that can be adjusted based on feedback from the error correction model 240. As further described herein below, the error correction model 240 may correct associations between training vector representations (or, similarly, training frames) and the categories. The corrections may be fed back to the loss function 232 as a penalty.

The training of the neural network 230 may include iteratively minimizing the loss function 232 and updating parameters of the neural network 230 through backpropagation. The neural network 230 may output category associations 234. This output may be provided as input to the error correction model 240 after each iteration, a number of iterations, or upon running the total number of iterations. A category association may correspond to a training vector representation that, in turn, corresponds to a training frame. The category association may associate the training vector representation (or, similarly, the training frame) with a category. In other words, the category association may indicate the predicted category of the training frame.

The error correction model 240 may detect errors in the category associations 234 and may correct some or all of the errors. Different types of errors may be detected and/or corrected including actual and potential errors, depending on the error correction techniques and contexts around the errors. Various techniques may be used by the error correction model 240 including pattern recognition. In one example, category associations 234 may indicate that a sequence of training frames are associated with alternating or interposing categories. For instance, if training frame "N−1" and training frame "N+1" are associated with the video start credits category and training frame "N" is associated with the video recap category (where "N−1," "N," and "N+1" indicate the order of these frames), the error correction model 240 may detect an incorrect pattern of associations and, accordingly, declare an error (e.g., an actual error or a potential for an error). The error correction model 240 may also correct this error based on a majority rule. For instance, if the majority of the training frames preceding and/or following training frame "N" are associated with the video start credits category, the error correction model 240 may change the category association of training frame "N" to the video start credits category. In another example, the pattern recognition may rely on historical information. For instance, the historical information may indicate that an early portion of video content (e.g., the first ten minutes or some other time period of the video content) typically excludes video end credits and the late portion of the video content (e.g., the last ten minutes or some other time period of the video content) typically excludes video start credits and video recap. Accordingly, if a training frame has a timestamp falling within the last portion and if its corresponding category association indicates an association to the video start credits category or video recap category, the error correction model 240 may declare an error and may correct the category association to the video end credits category. Similarly, if a training frame has a timestamp falling within the early portion and if its corresponding category association indicates an association to the video end credits category, the error correction model 240 may declare an error.

In an example, the error correction model 240 may output association corrections 242. An association correction may indicate that a category association of a training frame includes an error. The association correction may also include a correction to the association category. The association corrections 242 may be provided as feedback to the neural network 230 to update the loss function 232.

Figure 3:
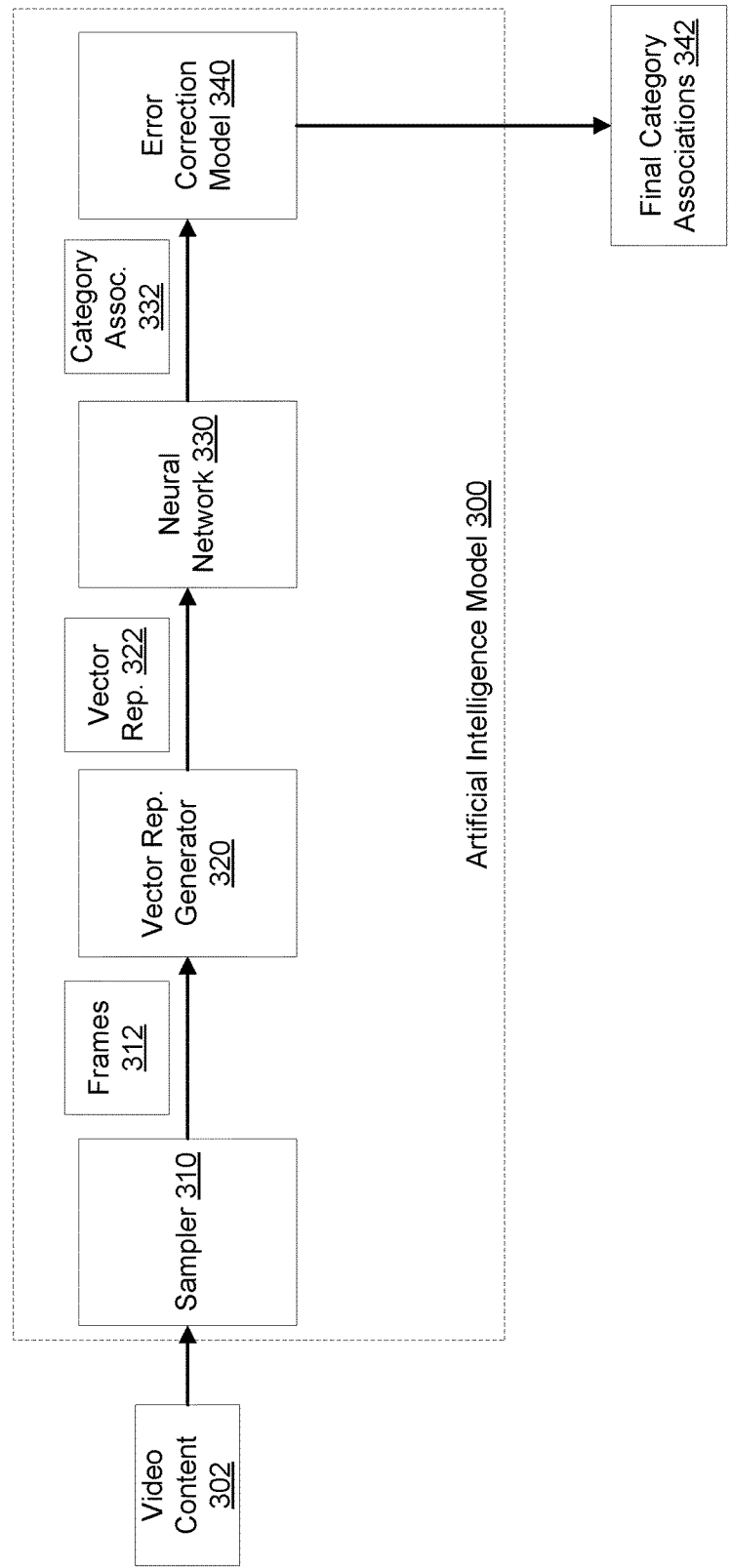
FIG. 3 illustrates an example computing environment for using an artificial intelligence model to identify portions of video content and optimize timing of these portions, according to an embodiment of the present disclosure.

FIG. 3 illustrates an example computing environment for using an artificial intelligence model 300 to identify portions of video content and optimize timing of these portions, according to an embodiment of the present disclosure. The artificial intelligence model 300 may correspond to a trained version of the artificial intelligence model 200 of FIG. 2. In particular, the artificial intelligence model 300 ma include a sampler 310 (that can be the same as the sampler 210), a vector representation generator 320 (that can be the same as the vector representation generator 220), a neural network 330 (that can be a trained version of the neural network 230), and an error correction model 340 (that can be the same as the error correction model 240).

Video content 302, such as a video file, may be provided as an input to the sampler 310. In response, the sampler 310 may select frames 312 based on a sampling of the video content at a particular frame (e.g., two frames per second, whereas the video content's frame rate may be twenty-four frames per second). The frames 312 may be input to the vector representation generator 320 as an ordered sequence (e.g., based on the order or timestamps of the frames 312).

The vector representation generator 320 may output vector representations 322 of these frames 312. Each vector representation may correspond to one of the frames 312 and the vector representations 322 may be organized as an ordered sequence (e.g., based on the order or timestamps of the frames 312). The sequence of the vector representations 322 may be input to the neural network 330.

The neural network 330 may output category associations 332. Each category association may correspond to a vector representation that, in turn, corresponds to a frame. The category association may associate the vector representation and/or the frame with a category (e.g., with one of video start credits, video recap, video end credits). The category associations 332 may be input to the error correction model 340.

The error correction model 340 may output final category associations 342. In an example, the error correction model 340 may use pattern recognition to detect and correct errors in the category associations 332 (e.g., based on associations with early and late portions of video content and the respective timestamps). Accordingly, the category associations 332 may be updated, resulting in the final category associations 342, some of which may be uncorrected category associations and other ones may be corrected category associations.

A computer system may use the final category associations 342 to generate video portion-to-category associations. For example, the computer system may identify the first frame and last frame associated with a category, determine the timestamps and/or order of these time frames, and may associate the corresponding portion of the video content with the category. In this way, the output of the neural network 330 (as further corrected by the error correction model 340, as applicable) may inherently define the start times and the end times of different portions of the video content. Because the neural network 330 is used, these start times and end times may represent optimized timings to define the portions.

In addition, to reduce the computational burden whether in the training of a neural network (such as in FIG. 2) or in the use of the trained neural network (such as in FIG. 3), some historical information may be used. For instance, the historical information may indicate that the first ten minutes (or some other time period) of video content typically excludes video end credits and the last ten minutes (or some other time period) of video content typically excludes video start credits and video recap. Accordingly, rather than processing the full content (e.g., training video content as in FIG. 2 or the video content as in FIG. 3), only the first ten minutes and the last ten minutes (or some other time periods) may be processed.

Figure 4:
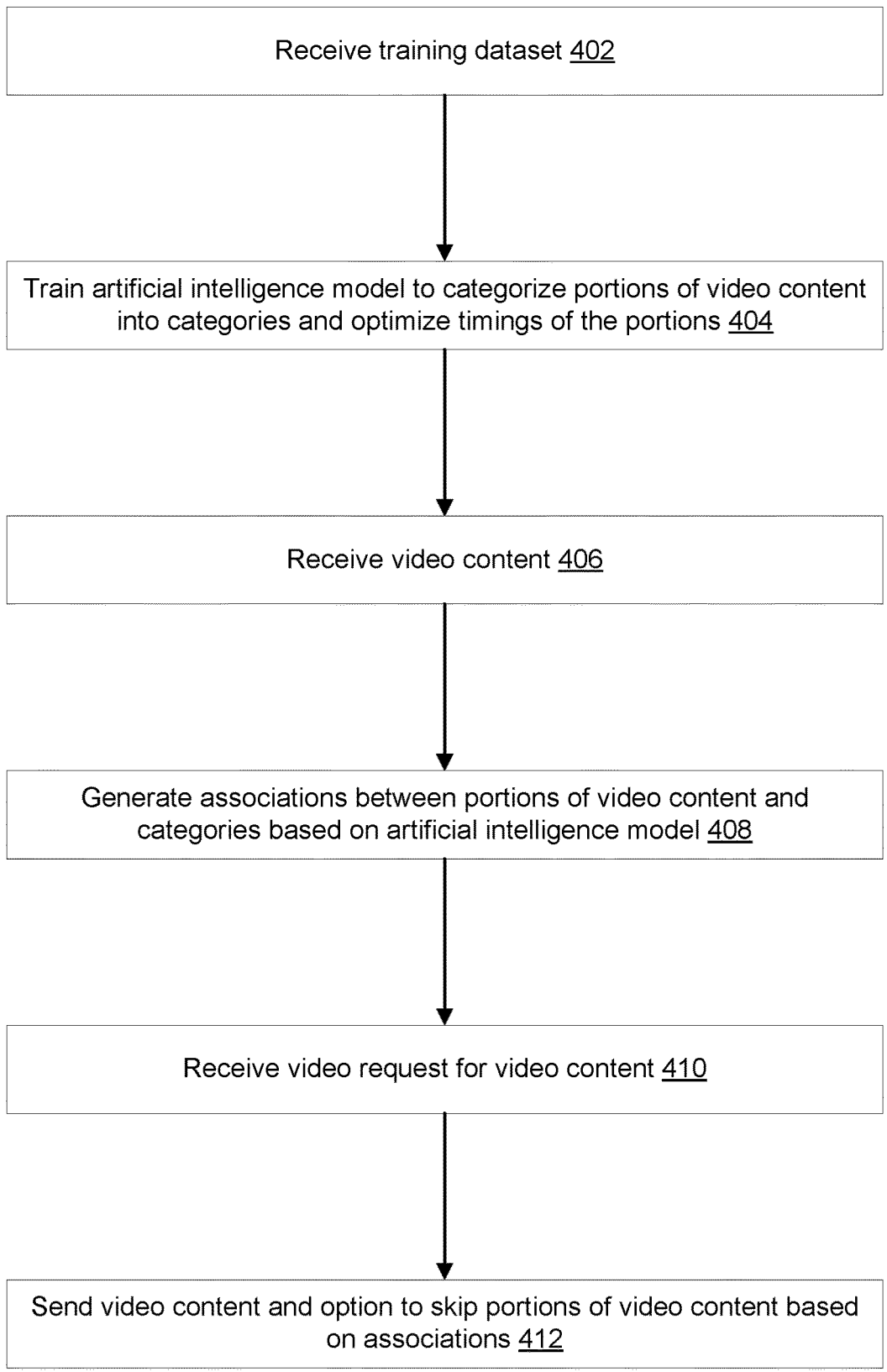
FIG. 4 illustrates an example flow for providing a multimedia service based on an artificial intelligence model, according to an embodiment of the present disclosure.
Figure 5:
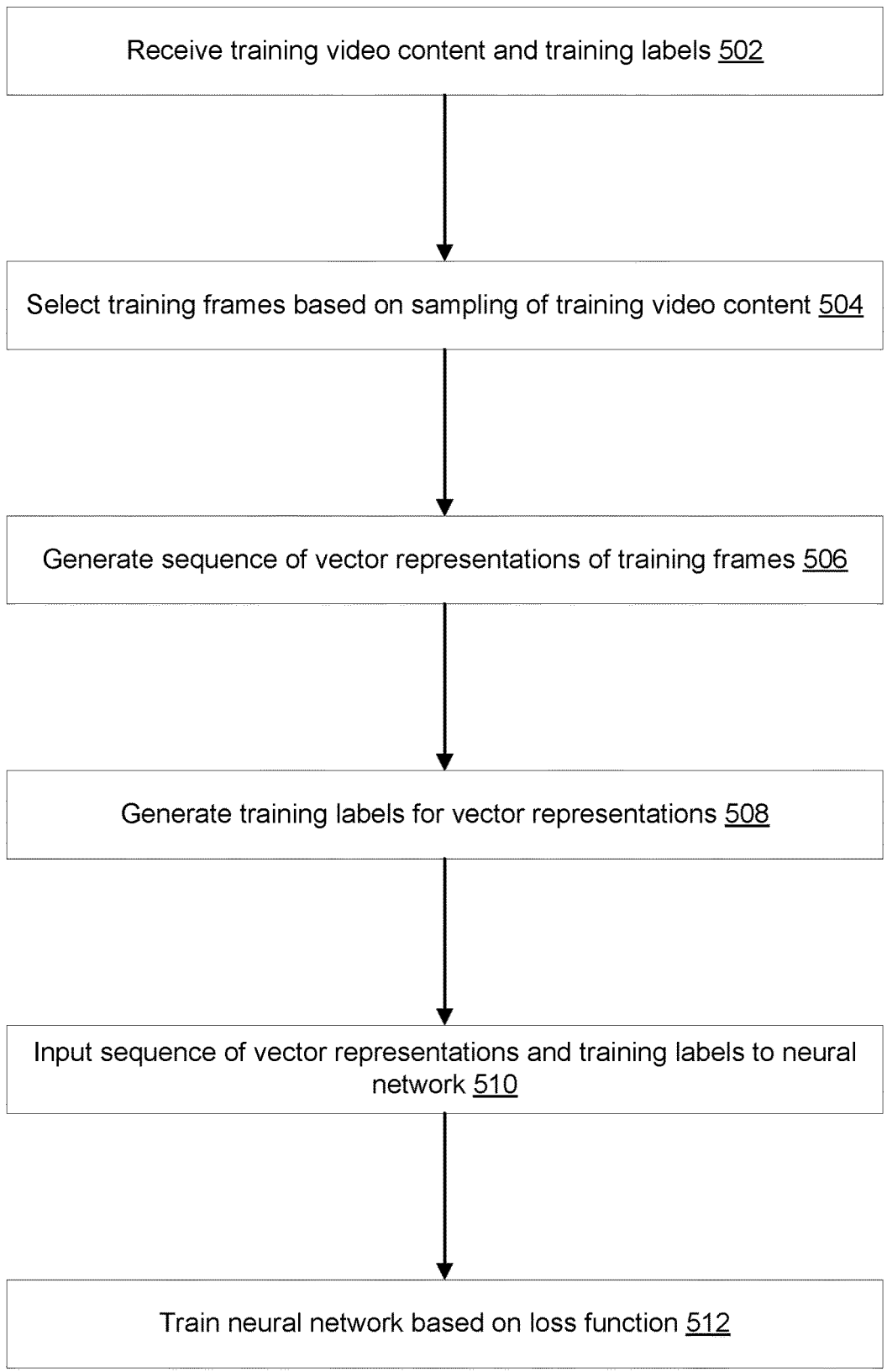
FIG. 5 illustrates an example flow for training an artificial intelligence model, according to an embodiment of the present disclosure.
Figure 6:
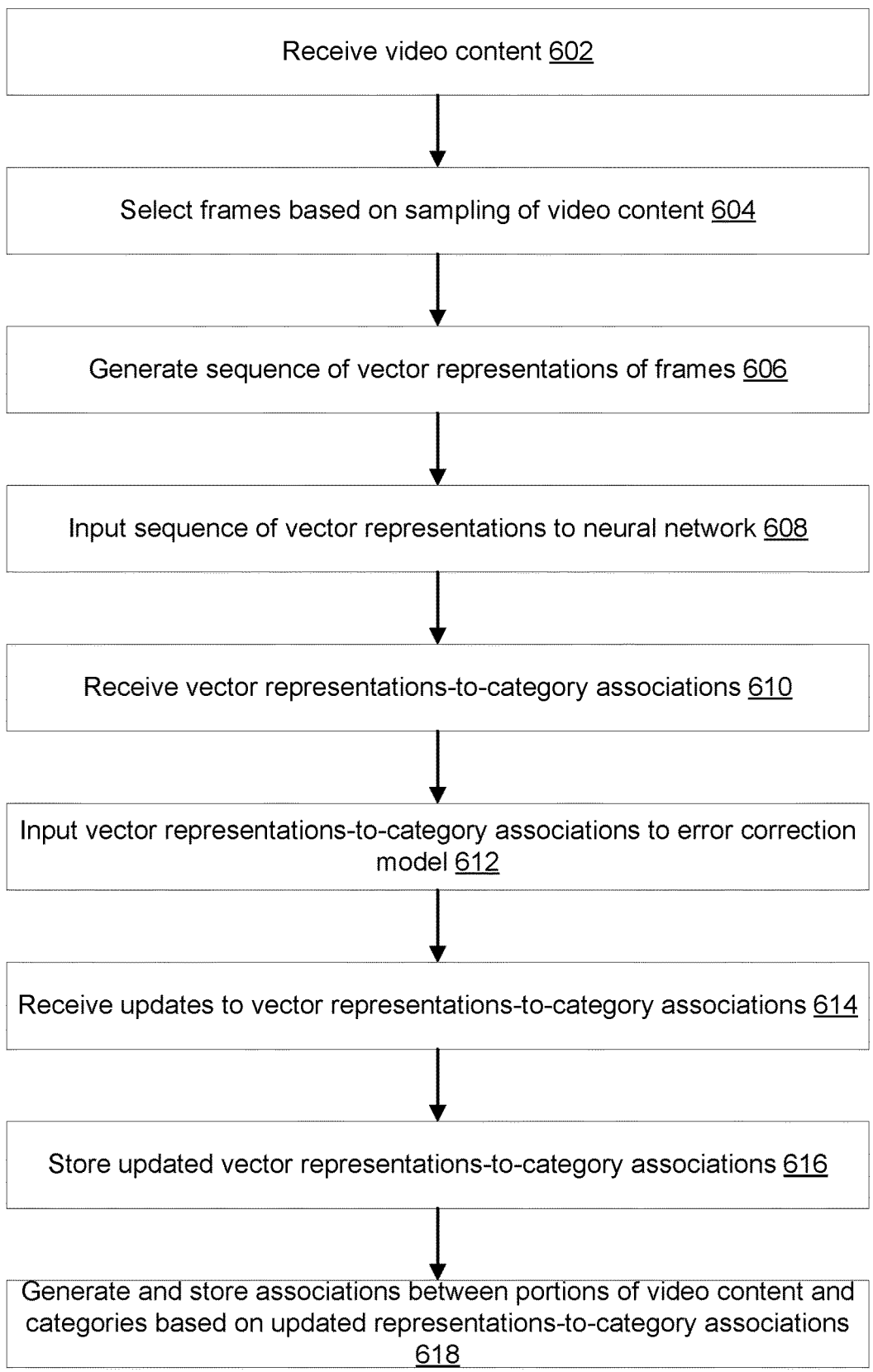
FIG. 6 illustrates an example flow for using an artificial intelligence model to identify portions of video content and optimize timing of these portions, according to an embodiment of the present disclosure.

FIGS. 4-6 illustrate example flows for associating portions of video content with categories, according embodiments of the present disclosure. Instructions for performing the operations of the flow can be stored as computer-readable instructions on a non-transitory computer-readable medium of a computer system, such as the computer system 110 described herein above in connection with FIG. 1. As stored, the instructions represent programmable modules that include code or data executable by a processor(s) of the computer system. The execution of such instructions configures the computer system to perform the specific operations shown in the figures and described herein. Each programmable module in combination with the processor(s) represents a means for performing a respective operation(s). While the operations are illustrated in a particular order, it should be understood that no particular order is necessary and that one or more operations may be omitted, skipped, and/or reordered.

FIG. 4 illustrates an example flow for providing a multimedia service based on an artificial intelligence model, according to an embodiment of the present disclosure. The artificial intelligence model may be similar to the artificial intelligence model 112 of FIG. 1 and may include a sampler, a vector representation generator, a neural network, and an error correction model as illustrated in FIGS. 2 and 3.

The example flow may start at operation 402, where the computer system may receive a training dataset. In an example, the training dataset may be available from a data store accessible to the computer system. The training dataset may also include a large and diverse set of training video contents of different lengths, genres, and types. In a supervised training mode, the training dataset may also include training labels identifying portions of each training video content and associating these portions with categories.

At operation 404, the computer system may train the artificial intelligence model to categorize portions of video content into the categories and optimize timings of the portions. In an example, the training dataset may be an input to the artificial intelligence model. The training video content may be sampled to select training frames, training vector representations may be generated from the training frames and may be input to the neural network, training labels for the training frames may be generates, parameters of the neural network (e.g., weights of the connections between the nodes at different layers of this network) may be updated based on minimization of a loss function given the training frames and training labels and, potentially, error feedback, and category associations may be generated and further corrected.

At operation 406, the computer system may receive video content. In an example, the video content may be a video file, such as a movie or an episode of a television series, available from a library of video content. The computer system may retrieve the video content from the library independently of or based on a request from a user device identifying the video content. If independent of such request, the video content may be retrieved as part of an automated process to generate metadata for video contents from the library.

At operation 408, the computer system may generate associations between portions of the video content and the categories based on the artificial intelligence model. In an example, the computer system may input the video content to the artificial intelligence model. In response, the artificial intelligence model may output associations between vector representations of frames or the frames themselves and the categories. The computer system may store these as key-value pairs. Further, the computer system may identify each portion of the video content and the association to a category by, for instance, defining that portion as starting at the first frame associated with the category and ending at the last frame associated with the category. The resulting identifications may be stored as association information. In an addition, the computer system may generate sequence information by organizing the portions into a sequence given their start and end times and by executing a set of rules or logic that may define how these sequences should be navigated with and without the selection(s) of skip option(s). The association information and the sequence information may be stored in metadata of the video content.

At operation 410, the computer system may receive a video request for the video content. In an example, the video request may be received from a user device and may identify the video content. In response, the computer system may query the library and retrieve the video content and the metadata.

At operation 412, the computer system may send the video content and an option to skip a portion of the video content to the user device. The skip option may be based on the associations between portions of the video content and the categories. For instance, the sequence information in the metadata may identify how the sequences can be navigated, where the navigations can be defined at least in part by skip options.

FIG. 5 illustrates an example flow for training the artificial intelligence model, according to an embodiment of the present disclosure. Operations of the example flow of FIG. 5 may be implemented as sub-operations of some of the operations of the example flow of FIG. 4. Further, and as explained herein above, the artificial intelligence model may include a sampler, a vector representation generator, a neural network, and an error correction model. The training may update the parameters of the neural network. Other components of the artificial network, such as the vector representation generator, may already have been trained.

The example flow may start at operation 502, where the computer system may receive training video content and training labels. The training labels may identify portions of the training video content and associate these portions with the categories (e.g., video start credits, video end credits, and video recap).

At operation 504, the computer system may select frames based on a sampling for the training video content. In an example, the training video content may have a particular frame rate, such as twenty-four frames per second. The computer system may input this training video content to the sampler. In response, the sampler may output the training frames based on the sampling at a different frame rate, such as two frames per second.

At operation 506, the computer system may generate a sequence of vector representations of the training frames. In an example, the computer system may input a sequence of the training frames to the vector representation generator, where this sequence may be organized based on the time-stamps and/or order of the training frames within the training video content. In response, the vector representation generator may output the sequence of vector representations, where this sequence may also be organized based on the timestamps and/or order of the training frames. Each of the vector representations may include a vector of features learned from the corresponding training frame based on pixel properties of the training frame.

At operation 508, the computer system may generate training labels for the vector representations. In an example, the training labels received at operation 502 may associate video content portions with the categories. Here, the computer system may re-associate the training labels with the vector representation and/or training frames. In particular, if a training label is from a video portion labeled as belonging to a particular category, the computer system may also label that training frame and the corresponding vector representation as belonging to the particular category.

At operation 510, the computer system may input the sequence of vector representation and the training labels associated with the vector representations to the neural network. At operation 512, the computer system may be training the neural network based on a loss function given the inputted sequence of vector representation and training labels. The training may include updating the parameters of the neural network by iteratively minimizing the loss function based on backpropagation. The loss function may be defined based on an error of associating a training frame with an incorrect category. In addition, the loss function may include an evaluation metric that can be adjusted based on error feedback from the error correction model.

FIG. 6 illustrates an example flow for using the artificial intelligence model to identify portions of video content and optimize timing of these portions, according to an embodiment of the present disclosure. The artificial model may have been trained, as illustrated herein above in connection with FIG. 5. Operations of the example flow of FIG. 6 may be implemented as sub-operations of some of the operations of the example flow of FIG. 4.

The example flow may start at operation 602, where the computer system may receive video content. In an example, the computer system may retrieve the video content from a library of video content.

At operation 604, the computer system may select frames based on sampling of the video content. In an example, the video content may have a particular frame rate, such as twenty-four frames per second. The computer system may input this video content to the sampler. In response, the sampler may output the frames based on the sampling at a different frame rate, such as two frames per second. In addition, to reduce the computational burden, the computer system may input the first section and the last section of the video content each having a certain duration (e.g., the first ten minutes and the last ten minutes) to the sampler. In that way, frames are selected only for these sections of the video content.

At operation 606, the computer system may generate a sequence of vector representations of the frames. In an example, the computer system may input a sequence of the frames to the vector representation generator, where this sequence may be organized based on the timestamps and/or order of the frames within the video content. In response, the vector representation generator may output the sequence of vector representations, where this sequence may also be organized based on the timestamps and/or order of the frames. Each of the vector representations may include a vector of features learned from the corresponding frame based on pixel properties of the frame.

At operation 608, the computer system may input the sequence of vector representations to the neural network. Here, no labels need to be inputted to the neural network because the neural network is already trained.

At operation 610, the computer system may receive, from the neural network, vector representations-to-category associations based on the input to the neural network. Each of these associations may identify a vector representation and/or the corresponding frame and may associate the vector representation and/or frame with one of the categories.

At operation 612, the computer system may input the vector representations-to-category associations to the error correction model. At operation 614, the computer system may receive, from the error correction model, updates associated with vector representations-to-category associations based on the input to the error correction model. In an example, the error correction model may detect errors in the inputted associations and generate corrections of these errors based on error pattern recognition. The updates may identify the errors and/or the corrections.

At operation 616, the computer system may store updated vector representations-to-category associations. In an example, the computer system may update the vector representations-to-category associations based on the corrections. In another example, if the updates merely identify that errors were detected in certain frames, the computer system may delete the vector representations-to-category associations corresponding to these frames. In both examples, upon completion of the update, the computer system may store the updated vector representations-to-category associations in a data store, such as key-value pairs in a database.

At operation 618, the computer system may generate and store associations between portions of the video content and the categories based on the updated representations-to-category associations. In an example, the computer system may identify the portions based on the timings of the frames and the associated categories. Each of the portions may be then associated with the category of the frames that fall under that portion.

Figure 7:
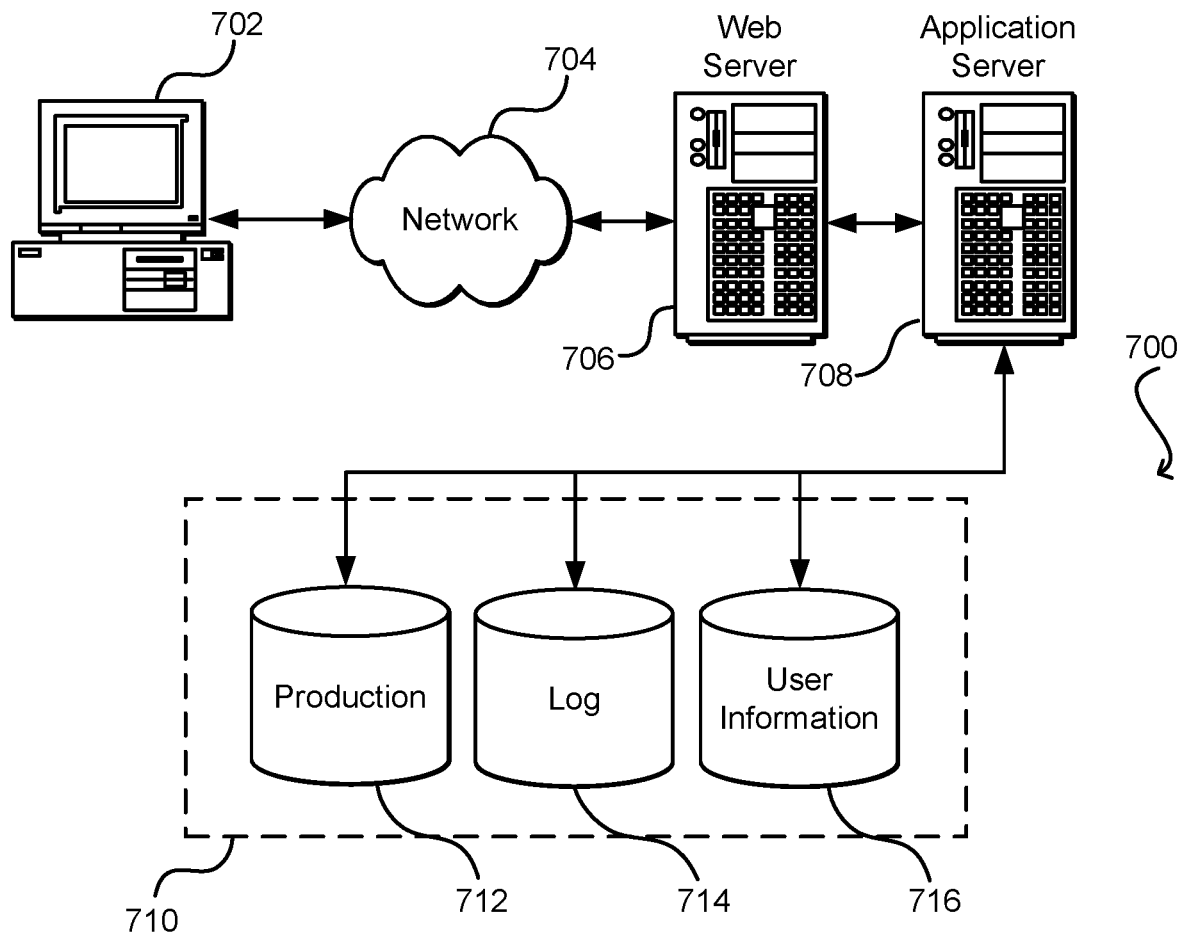
FIG. 7 illustrates a computer architecture diagram showing an example computer architecture, according to an embodiment of the present disclosure.

FIG. 7 illustrates a computer architecture diagram showing an example computer architecture, according to an embodiment of the present disclosure. This architecture may be used to implement some or all of the systems described herein. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7. It should also be appreciated that many computers, such as the computer 700, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by a computer system, the method comprising:
    inputting, to a neural network, a sequence of vector representations corresponding to frames from video content, the neural network configured to associate a frame with one of a plurality of categories based at least in part on an error of associating the frame with an incorrect category, the plurality of categories comprising video start credits, video end credits, and a video recap and are associated with corresponding start times and end times, the error based at least in part on a comparison of timing of the frame and a time duration, the time duration defined based at least in part on a difference between a start time and an end time of the incorrect category and on an error time margin relative to the start time or the end time of the incorrect category;
    receiving, based at least in part on the neural network, associations between the vector representations from the sequence and the plurality of categories; and
    generating, based at least in part on the associations, identifiers of the video start credits, video end credits, and video recap in the video content, the identifiers identifying the corresponding start times and end times of the video start credits, video end credits, and video recap.

2. The method of claim 1, further comprising:
    selecting the frames based at least in part on a sampling of the video content according to a frame rate; and
    inputting a sequence of the frames to a second neural network, wherein the sequence of vector representations is received from the second neural network based at least in part on the sequence of the frames.

3. The method of claim 1, further comprising:
    inputting, to an error correction model, the associations between the vector representations from the sequence and the plurality of categories; and
    updating, based at least in part on an output of the error correction model, the associations.

4. A computer system comprising:
    one or more processors; and
    one or more computer-readable storage media storing instructions that, upon execution by the one or more processors, configure the computer system to:
        input, to a neural network, a vector representation of a frame from content, the neural network associated with an error of associating the frame with an incorrect category, the error based at least in part on a comparison of timing of the frame and a time duration, the time duration defined based at least in part on a difference between a start time and an end time of the incorrect category and on an error time margin relative to the start time or the end time of the incorrect category;
        receive, based at least in part on the neural network, an association between the vector representation and a category; and
        generate, based at least in part on the association, an identifier of a portion of the content, the identifier associating the portion of the content with the category and identifying at least one of a start time or an end time of the portion of the content, the portion of the content comprising the frame.

5. The computer system of claim 4, wherein the content comprises video content, and wherein the category comprise at least one of: video start credits, video end credits, or a video recap.

6. The computer system of claim 4, wherein the instructions upon execution further configure the computer system to:
receive a training sequence of training vector representations, wherein:
a training vector representation corresponds to a training frame that is associated with a training label,
the training label identifies the category from a plurality of categories, and
the plurality of categories are associated with respective start times and end times; and
train the neural network by at least inputting the training sequence to the neural network, wherein the training comprises updating parameters of the neural network based at least in part on a loss function, and wherein the loss function is defined based at least in part on the error.

7. The computer system of claim 6, wherein the training vector representations correspond to training frames from training content, wherein the training content comprises frames at a frame rate, and wherein the training frame is selected from the frames based at least in part on a sampling of the training content according to a different frame rate.

8. The computer system of claim 6, wherein the category comprises video start credits or a video recap, wherein the training vector representations correspond to training frames from an early portion of training video content, wherein the early portion has a corresponding time duration starting at a beginning of the training video content based at least in part on the category.

9. The computer system of claim 6, wherein the category comprises video end credits, wherein the training vector representations correspond to training frames from a late portion of training video content, wherein the late portion has a corresponding time duration ending at an end of the training video content based at least in part on the category.

10. The computer system of claim 6, wherein training the neural network comprises updating parameters of the neural network based at least in part on a minimization of the loss function.

11. The computer system of claim 4, wherein the vector representation is received in a sequence of vector representations, wherein the sequence is received as an output from a second neural network, wherein the second neural network generates the sequence based at least in part on an input to the second neural network comprising a sequence of frames from the content.

12. The computer system of claim 11, wherein the vector representation of the frame comprises features that are learned by the second neural network based at least in part on pixel properties of the frame.

13. One or more non-transitory computer-readable storage media storing instructions that, upon execution by one or more processors, cause a computer system to perform operations comprising:
inputting, to a neural network, a vector representation of a frame from content, the neural network associated with an error of associating the frame with an incorrect category, and the error based at least in part on a comparison of timing of the frame and a time duration, the time duration defined based at least in part on a difference between a start time and an end time of the incorrect category and on an error time margin relative to the start time or the end time of the incorrect category;
receiving, based at least in part the neural network, an association between the vector representation and a category; and
generating, based at least in part on the association, an identifier of a portion of the content, the identifier associating the portion of the content with the category and identifying at least one of a start time or an end time of the portion of the content, the portion of the content comprising the frame.

14. The one or more non-transitory computer-readable storage media of claim 13, wherein the operations further comprise:
selecting frames based at least in part on a sampling of the content according to a frame rate;
inputting a sequence of the frames to a second neural network trained to generate vector representations; and
inputting, to the neural network, a sequence of the vector representations generated by the second neural network and comprising the vector representation of the frame.

15. The one or more non-transitory computer-readable storage media of claim 13, wherein the frame is associated with a timestamp, and wherein the operations further comprise:
storing, in a database, an association between the timestamp and the category as a key-value pair based at least in part on the association between the vector representation and the category.

16. The one or more non-transitory computer-readable storage media of claim 15, wherein the operations further comprise:
sending, to a user device, the content and an option to skip the portion of the content, wherein the option is based at least in part on the association between the timestamp and the category from the database.

17. The one or more non-transitory computer-readable storage media of claim 13, wherein the content comprise first live stream content, wherein the operations further comprise:
sending, to a user device, a first stream of content comprising the first live stream content; and
updating, based at least in part on the association between the vector representation and the category, the first stream to switch to a second stream of content, include second live stream content, or include pre-stored content.

18. The one or more non-transitory computer-readable storage media of claim 13, wherein the operations further comprise:
inputting, to an error correction model, associations between vector representations of frames from the content and a plurality of categories; and
storing, based at least in part on an output of the error correction model, updated associations between the vectors representations and the plurality of categories.

19. The one or more non-transitory computer-readable storage media of claim 18, wherein the frames comprise a first frame followed by a second frame that is followed by a third frame, and wherein the output of the error correction model indicates an error based at least in part on a determination that the first frame and the third frame are associated with a first category and that the second frame is associated with a second category.

20. The one or more non-transitory computer-readable storage media of claim 18, wherein the content comprises video content, wherein the plurality of categories comprise video start credits, video end credits, and a video recap, wherein the frames are from an early portion of the video content starting at a beginning of the video content, and wherein the output of the error correction model indicates an error based at least in part on a determination that at least one of the frames is associated with the video end credits.

* * * * *

UNITED STATES PATENT AND TRADEMARK OFFICE
CERTIFICATE OF CORRECTION

PATENT NO. : 10,848,791 B1
APPLICATION NO. : 16/174844
DATED : November 24, 2020
INVENTOR(S) : Vernon Germano et al.

It is certified that error appears in the above-identified patent and that said Letters Patent is hereby corrected as shown below:

In the Claims

Column 17, Line 2, Claim 5:
Delete: "comprises video content, and wherein the category comprise"
Insert: --comprises video content, and wherein the category comprises--

Column 18, Line 39, Claim 17:
Delete: "storage media of claim 13, wherein the content comprise"
Insert: --storage media of claim 13, wherein the content comprises--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*